FIG. I

INVENTORS
ARTHUR L. SAXTON
RONALD J. JENKINSON

Aug. 29, 1972  A. L. SAXTON ET AL  3,687,841

CATALYTIC CRACKING PROCESS

Filed Oct. 5, 1970  2 Sheets-Sheet 2

INVENTORS
ARTHUR L. SAXTON
RONALD J. JENKINSON

BY *C.W. Grady Jr.*
ATTORNEY

United States Patent Office 3,687,841
Patented Aug. 29, 1972

3,687,841
CATALYTIC CRACKING PROCESS
Arthur L. Saxon, Warren, N.J., and Ronald J. Jenkinson, Weybridge, England, assignors to Esso Research and Engineering Company
Filed Oct. 5, 1970, Ser. No. 77,912
Int. Cl. B01j 9/20; C10g 11/18
U.S. Cl. 208—164                                4 Claims

ABSTRACT OF THE DISCLOSURE

In a catalytic cracking process comprising forming a suspension of catalyst particles in hydrocarbon vapors, passing said suspension through a conversion zone wherein said hydrocarbons are cracked, separating said cracked hydrocarbons from the spent catalyst particles, passing said cracked hydrocarbons to a recovery zone, stripping said spent catalyst particles of residual hydrocarbon vapors in a stripping zone, regenerating said spent catalyst to active catalyst in a regenerator zone and recycling said active catalyst to said conversion zone, the improvement is provided which comprises maintaining a substantially constant catalyst inventory level in the stripping zone essentially independently of any change in the catalyst circulation rate within the conversion zone by interposing a hydraulic catalyst seal between the conversion zone and the stripping zone, whereby upon any change in the catalyst circulation rate within the conversion zone, the pressure within the stripper is independently commensurately adjusted causing a compensating change in the hydraulic catalyst seal thereby maintaining the catalyst inventory level in the stripper substantially constant.

---

This invention relates to the catalytic conversion of hydrocarbons and more particularly relates to the fluid catalytic cracking of hydrocarbons.

Fluid catalytic cracking units are well known in the art. Generally, these units are employed in a process which comprises introducing a hydrocarbon oil feed to be converted into the lower portion of a fluid catalytic conversion zone for admixture with catalyst particles to form a relatively dilute suspension of catalyst particles in hydrocarbon vapors. This relatively dilute suspension is passed as a substantially up-flowing stream through an elongated conversion zone. In some cases this elongated conversion zone terminates in an enlarged secondray conversion zone in which a dense fluidized bed of catalyst can be maintained. In such cases the dense bed catalyst inventory can be adjusted by various means which are well known to those skilled in the art—thus providing a large measure of control over the catalytic cracking intensity. It has been found that this dense bed of catalyst is unnecessary in some cases and that preferred results can be obtained by a properly designed "transfer-line" reactor which discharges the dilute catalyst suspension directly into a catalyst separator device. The present invention is primarily concerned with this latter type of transfer-line reactor unit.

Upon completion of passage through the conversion zone, the spent catalyst particles are separated from the cracked hydrocarbon vapors. The crude cracked product is passed to a fractionator wherein the various cracked products can be separated into useful fractions. The spent catalyst particles are stripped of residual hydrocarbons upon passage through a stripping zone. The catalyst, substantially free of volatiles, is then discharged from the stripper and passed through a regenerator wherein the catalyst is regenerated by burning off the nonvolatile materials such as coke to regenerate the catalyst for reuse. After regeneration, the catalyst is recycled to the reactor.

Good control of the circulating catalyst stream is essential for economic operation of catalytic cracking units. Erratic flow causes fluctuations in the quality of the regenerated catalyst, the catalyst/oil ratio, the reactor catalyst inventory, and the reactor temperature— all of which have important effects on the product yields and on the feed capacity of an operating unit. The deficiencies attributable to poor catalyst flow control are greater in a transfer-line reactor than in a dense bed reactor where the relatively large catalyst inventory serves as a fly-wheel to minimize the effects of flow rate changes. Generally, catalyst circulation in existing transfer-line catalytic cracking units is controlled by slide valves or other similar control devices which are subject to wear and deterioration. Slide valve problems have been reduced by careful attention to design—including the use of special hard facing materials—and by use of double or even triple valves which permit extending run length by successive use of individual valves for catalyst flow control. These slide valve problems have been eliminated in dense bed reactor designs using a dynamic pressure balance control system such as disclosed in U.S. Pat. No. 2,589,124. This control system has worked well on dense bed reactor units; however, it is less satisfactory in transfer-line reactor designs. The specific limitation in transfer-line reactor designs is a lack of reactor holdup flexibility; this is requied to accommodate minor changes in regenerator holdups which occur when air rate to the regenerator is changed causing a change in regenerator dense bed density.

It is an object of the present invention to overcome the above-noted deficiencies of present catalyst flow control systems.

It is another object of the present invention to provide an improved catalytic cracking process wherein valves and orifices in the fluid catalyst phase are eliminated in operation and control is exercised by valves solely in vapor lines.

It is a still further object of the present invention to eliminate the need for building strippers and regenerators at relatively high elevations in order to obtain the necessary pressure differentials to enable control of catalyst circulation rates with valves in the catalyst flow lines.

Still another object of the present invention is to provide an improved process wherein the pressure within the stripper can be regulated independently of reactor pressure.

These as well as other objects are accomplished by the present invention which provides an improved catalytic cracking process wherein a hydraulic seal of catalyst is interposed between the reactor and the stripper thereby enabling the stripper pressure to be regulated independently of reactor pressure. Adjustments of stripper pressure and the pressure differential between the regenerator and reactor can be made to control the catalyst levels and circulation rate. As the pressure differential between the regenerator and the reactor is increased, circulation increases until the static head increase in the reactor rebalances the applied differential. Through independent adjustment of the stripper pressure in accordance with the present invention, the stripper and regenerator catalyst inventory levels can be maintained constant or reset. The use of a hydraulic seal in accordance with the present invention avoids the necessity for restrictions or valves in the fluid catalyst phase to establish equilibrium. Moreover, the use of control air as in U.S. Pat. 2,589,124 is also avoided.

Although the invention is broadly directed to the catalytic conversion of organic compounds, it is specifically directed to the catalytic cracking of hydrocarbons. While the feedstock of the present invention can be any fluid, such as an organic compound which is to be contacted with any particular solid to achieve chemical or thermal changes by conversion thereof to valuable products, the invention is primarily concerned with feedstocks such as crude petroleum fractions and the like, especially those boiling in the range of about 100° to about 1300° F. Thus the invention can be practiced with gasoline fractions, kerosene fractions, middle distillate or heating oil fractions, process gas oil fractions, vacuum gas oil fractions and the like. A preferred feedstock is a crude petroleum fraction such as those in the range indicated. Most preferably, the feedstock is a gas oil fraction which can be a converted fraction or virgin crude petroleum fraction.

The temperatures which can be employed in the transfer-line reactor of the present invention can range from about 800° to about 1200° F. and preferably range from a temperature between about 900° and about 1100° F.

Pressures within the reactor can range from about atmospheric pressure up to about 100 p.s.i.g.; preferably the pressure can range from about 10 p.s.i.g. to about 30 p.s.i.g.

The velocity of the suspension within the reactor can suitably range from about 4 to about 150 ft./sec. and preferably from about 8 to about 60 ft./sec.

The solids density within the reactor can range from about 0.5 to about 30 lb./cubic foot with a preferred range being from about 1 to about 6 pounds per cubic foot. Thus, in the practice of the present invention the reaction is conducted in a so-called disperse phase, that is, the catalyst is suspended in the hydrocarbons and the suspension has an average density within the range of from about 1 pound per cubic foot to about 6 pounds per cubic foot.

The catalysts employed in the practice of the present invention are finely divided conversion catalysts such as cracking catalysts. Typically, a silica-alumina catalyst can be employed but silica-magnesia, silica-zirconia and the like can also be employed.

The catalyst is in a finely divided condition, and normally has a particle size within the range of from about 0.01 micron up to 150 microns with a major amount of a catalyst having a particle size within the range of from about 20 to about 80 microns.

The present invention will be more completely described by reference to the drawing wherein.

Figure 1:
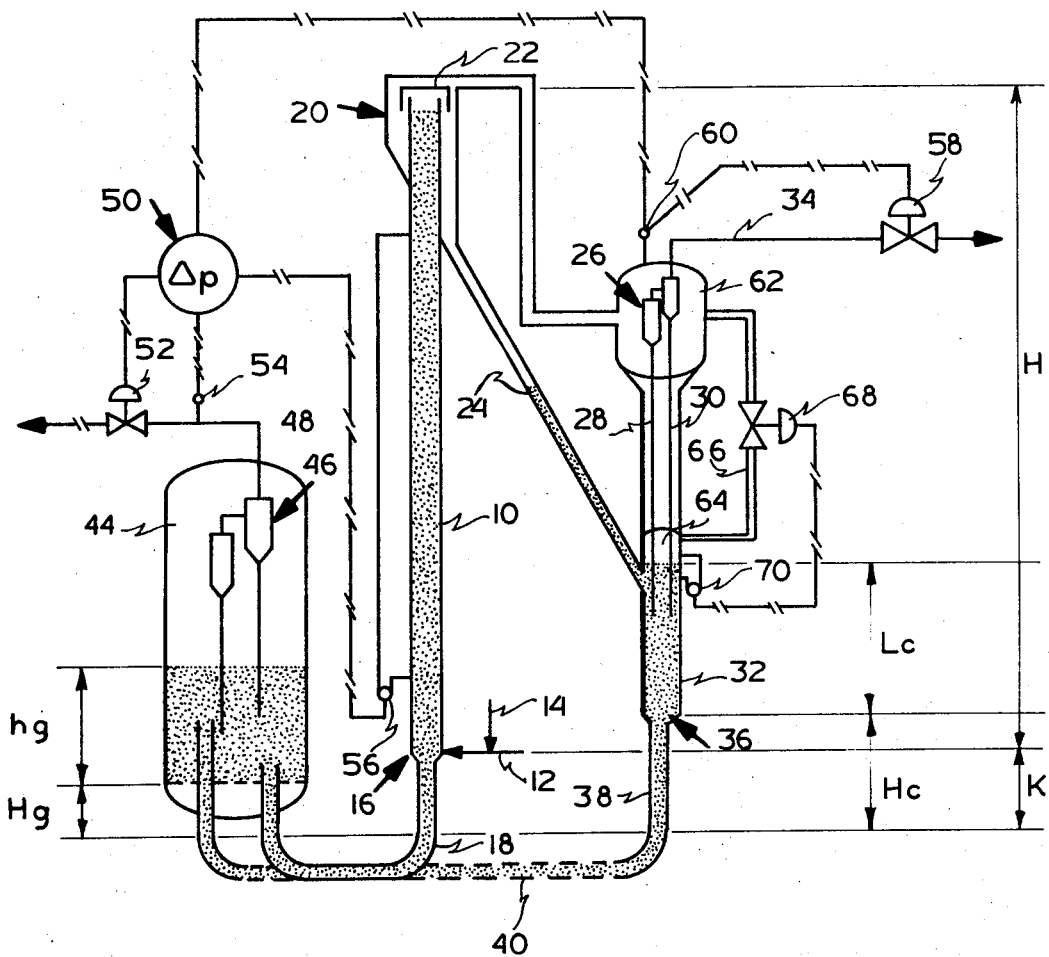
FIG. 1 is a schematic flow diagram of one embodiment of the present invention.

Referring now to FIG. 1, there is shown a transfer-line reactor 10 having a substantially uniform cross-sectional diameter from its lower end to its upper end. At the lower end of the transfer-line reactor 10 is shown feed line 12 adapted to provide a feed stream to the reactor for cracking. An auxiliary steam stream 14 is normally added to aid in vaporizing and dispersing the feed. Additionally, one or a plurality of steam inlet lines 16 are adapted to introduce steam into the reactor during startup or emergency feedout periods. The transfer-line reactor 10 terminates in a rough-cut catalyst separator shown generally as 20 wherein a rough separation is made between the spent catalyst and the cracked product upon contact with a baffle plate or cap 22 whereby the bulk of the catalyst falls by gravity into hydraulic seal leg 24 which is described in more detail hereinafter. The cracked product containing catalyst fines passes overhead to cyclone separation means 26 wherein the catalyst fines are separated from the cracked product and are discharged through dip legs 28 and 30 into the stripper 32. The crude cracked products are discharged from the cyclone separation means 26 by way of line 34 and are introduced thereby into a fractionator (not shown) which can be a plurality of fractional distillation zones suitably equipped with all auxiliary equipment usually associated with commercial distillation towers. This equipment includes, for example, internal vapor-liquid contacting means, cooling and condensing means, means for inducing reflux, and heating or cooling means and the like in the bottom of the tower. The various cracked products are separated within the fractionator and are then passed to recovery. If desired, intermediate and heavy fractions thus obtained can be recycled to the transfer-line reactor.

The spent catalyst is fed from hydraulic seal leg 24 and dip tubes 28 and 30 and flows downwardly into the stripper 32. The stripper is provided with a steam inlet line 36 which provides stripping steam for contact with the downwardly moving catalyst to remove entrained hydrocarbon vapors and volatiles such as vaporizable hydrocarbons therefrom. The catalyst, substantially free of volatiles, is discharged from the stripper 32 by line 38 and flows through U-bend line 40 into regenerator 44 wherein the catalyst is regenerated by burning off the nonvolatile materials, such as coke, to regenerate the catalyst for reuse. The regenerator 44 can be a conventional regenerator vessel such as has been described in the literature. Preferably the regenerator vessel 44 is of the down-flow type wherein the catalyst is regenerated in a dense bed by burning off the nonvolatiles including coke. In such instances the products of combustion are separated from the catalyst by means of internal cyclone separators shown generally as 46, with the products of combustion being discharged by line 48 to the atmosphere. If desired, the hot-flue gases can be passed through a waste-heat boiler (not shown) or the like, for producing steam, but this is not necessary to the present invention. The regenerated catalyst is withdrawn from regenerator 44 through U-bend line 18 and introduced thereby into the transfer-line reactor 10.

In accordance with the present invention, control of catalyst levels and circulation rate is obtained by valves solely in vapor lines. This is accomplished by the provision of a hydraulic seal 24 between the reactor 10 and the stripper 32 which enables stripper pressure to be regulated independently of reactor pressure, thereby eliminating the need for restrictions or valves in the fluid catalyst phase to establish equilibrium.

A pressure differential recording control system 50 is associated with pressure differential control valve 52 through which the flue gases pass out to the atmosphere. The pressure differential recording control system controls valve 52 in response to the differential pressure between the reactor 10 and regenerator 44. The pressure differential control system 50 is connected by way of pressure probe 54 to the top of regenerator vessel 44 and with the pressure differential across transfer-line reactor 10 by pressure probes 56 and 60. The pressure drop across the transfer-line reactor is primarily a measure of the dispersed catalyst static head which varies with catalyst flow rate, and is automatically controlled by minor adjustments effected by the differential pressure control associated with valve 52. Thus by control of the egress of the flue gases through valve 52, the circulation of the catalyst in the transfer line reactor 10 can be regulated by the resulting pressure differential between the regenerator 44 and the reactor. Thus, control over the catalyst circulation rate is accomplished externally of the fluid catalyst system and independently of the remainder of the system, i.e., the stripper and cracked product effluent system. Thus, for example, if the pressure differential between the regenerator 44 and the reactor 10 decreases, the pressure differential control system closes valve 52 slightly to increase the pressure in the regenerator thereby forcing more catalyst into the reactor through line 18. Conversely, if the pressure differential between the regenerator and the reactor increases, the pressure differential control system opens valve 52 slightly to decrease the pressure in the regenerator and to reduce the amount of catalyst being passed into the reactor through line 18.

The pressure differential control system 50 can alternatively regulate the catalyst circulation rate by control of valve 58 in response to the pressure drop across the transfer-tube reactor 10 as sensed by pressure probes 56 situated proximate the lower end of the reactor and pressure probe 60 located in the cyclone housing 62 about the cyclone separation means 26. The pressure within the cyclone housing 62 is substantially equivalent to the pressure within the rough-cut catalyst separator 20 which corresponds with the pressure at the top of the reactor 10. Valve 58 can be situated in the line 34 carrying the crude cracked product to the fractionator or, if desired, it can be located down-stream of the fractionator. Thus, if the pressure drop across the reactor decreases, the pressure differential control system opens valve 58 slightly to decrease the pressure at the top of the transfer-tube reactor 10 thereby increasing the pressure drop across the reactor and maintaining the desired catalyst flow rate. Conversely, if the pressure drop across the reactor increases, the pressure differential control system closes valve 58 slightly, thereby increasing the pressure at the top of the reactor, effectively decreasing the pressure drop across the reactor and again maintaining the desired constant catalyst flow rate.

The stripper 32 must provide stripped catalyst at a rate responsive to variations in the circulation rate of the fluidized catalyst through the transfer-line reactor 10. However, it is desirable to maintain substantially constant catalyst inventories in both the stripper 32 and regenerator 44 to insure proper regeneration and formation of active catalyst. This is accomplished in accordance with the present invention by providing a hydraulic seal leg 24 between the reactor 10 and the stripper 32 which enables stripper pressure to be regulated independently of reactor pressure. A hydraulic seal is obtained by connecting the rough-cut catalyst separator zone 20 with the catalyst inventory in the stripper through hydraulic seal leg 24. Hydraulic seal leg 24 enters the stripper below the level of the catalyst inventory. The bulk of the catalyst emanating from the transfer-line reactor 10 undergoes a change of direction imposed by cap 22 and falls by gravity through hydraulic seal leg 24 into the catalyst inventory in the stripper 32. The combined effect of the catalyst in the hydraulic seal leg 24 and the catalyst inventory in the stripper is to form a hydraulic seal of catalyst which is responsive solely to variations in pressure in the vapor space 64 above the stripper.

As the differential pressure between the regenerator and reactor is increased, circulation increases within the transfer-line reactor until the static head increase in the reactor rebalances the applied differential. In accordance with the present invention, independent adjustment of the stripper pressure controls catalyst level in the stripper. The regenerator inventory and level will also be essentially constant; it will vary slightly at a constant total unit inventory—to balance the small change in transfer-line reactor inventory and in the hydraulic seal leg 24. Changes in overall unit inventory, due to an unbalance between fresh catalyst additions versus catalyst withdrawals and losses, will be reflected in the regenerator inventory.

Stripping gas such as steam is passed through line 36 into a distributor (not shown) at the bottom of the stripper 32. The stripping gas passes upwardly through the stripper vessel to displace the entrained and adsorbed hydrocarbons from the catalyst particles. The stripping gas leaves the vapor space 64 at the top of the stripper through line 66 and valve 68 and into the cyclone housing and ultimately out through line 34 to the fractionator. During normal operations, the pressure in the vapor space 64 above the stripper is about 2–5 p.s.i. higher than the pressure in the effluent line 34. A level sensing device 70 is associated with valve 68 and is adapted to regulate the pressure in the vapor space 64 above the catalyst inventory in order to maintain a predetermined catalyst level within the stripper. For example, if the regenerator pressure is increased with a constant pressure on the reactor, resulting in an increase in the fluid catalyst circulation rate within the transfer-line reactor 10, the stripper would have to return stripped catalyst to the regenerator at an equivalent faster rate. At the same time the increased regenerator pressure will be transmitted through the fluidized U-bend line 40 into the stripper and will tend to force an increase in the stripper level. In order to maintain the desired constant stripper level and an increased catalyst flow rate back to the regenerator, valve 68 would be closed slightly. An increased pressure differential will then exist between the stripper vapor in space 64 and the reactor separator 20, which will be compensated for by an increase in the catalyst head in the hydraulic seal leg 24. Conversely, upon the reduction of the catalyst circulation rate within the transfer-line reactor 10 due to a decrease in regenerator pressure, the level indicator 70 within the stripper would sense a decrease in catalyst level within the stripper. As the catalyst level drops, valve 68 would be opened slightly decreasing the pressure in the vapor space 64 above the stripper, thereby allowing the catalyst level to decrease in the hydraulic seal leg 24 and thereby maintaining an essentially constant level within the stripper. Thus it can be seen that in accordance with the present invention, catalyst inventory levels in both the stripper and regenerator can be maintained essentially independently of variations in the catalyst circulation rate within the transfer-line reactor.

Figure 2:
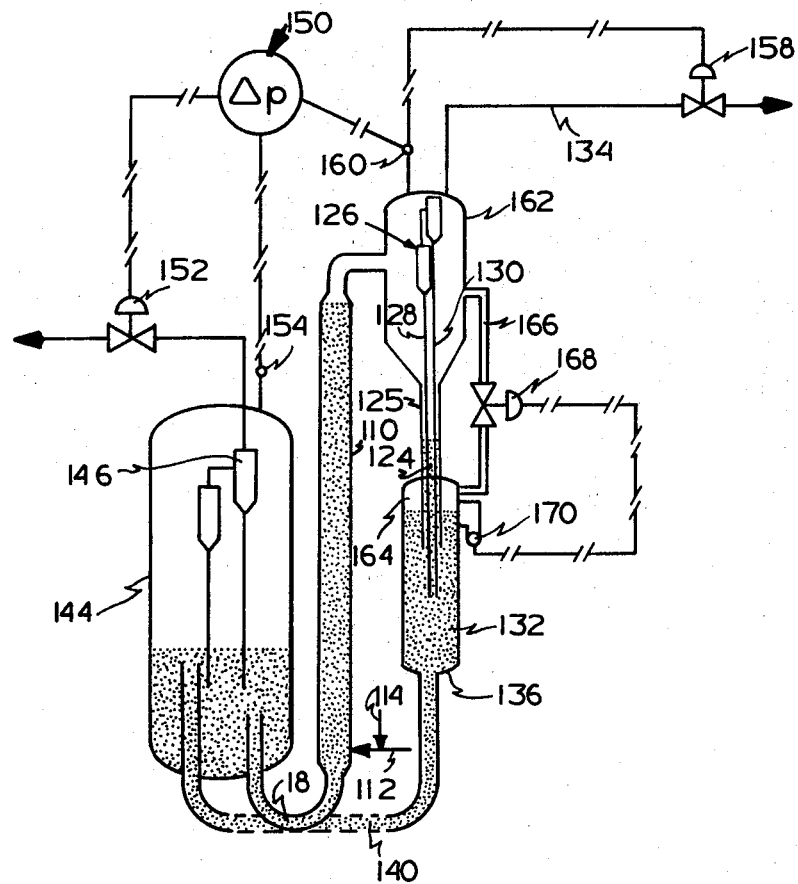
FIG. 2 is a schematic flow diagram of an alternative embodiment of the present invention.

Referring now to FIG. 2, there is shown an alternative embodiment of the present invention. In the embodiment shown in FIG. 2, a suspension of the catalyst in the cracked product vapors passes overhead to cyclone separation means 126 wherein the catalyst is separated from the cracked product and is discharged through dip legs 128 and 130 through standpipe 125 into the stripper 132. In this manner, a hydraulic catalyst seal 124 is created in standpipe 125 which isolates the reactor 110 from the stripper 132. A level sensing device 170 is associated with valve 168 and is adapted to independently regulate the pressure in vapor space 164 above the catalyst inventory in order to effect a commensurate change in the hydraulic catalyst seal level thereby maintaining a predetermined catalyst level within the stripper regardless of changes in the catalyst circulation rate in the transfer-line reactor 110.

The following examples further illustrate the present invention. All percentages and parts are by weight unless otherwise stated.

EXAMPLE I

Employing the catalytic cracking system substantially as shown in FIG. 1, the catalyst circulation control system of the present invention is illustrated by taking pressure balances of the system at different catalyst circulation rates.

Thus the pressure balance corresponding to the regenerated catalyst circuit is expressed as follows:

$$\Delta P_1 = R_g - R_c = \frac{-1}{144}(h_g d_g + H_g d_s - K d_s - H d_r) + F + L$$

The pressure balance for the spent catalyst circuit is expressed as follows:

$$\Delta P_2 + \frac{1}{144}(h_g d_g + H_c d_s - (H_g + L_c)d_s)$$
$$- F_2 = R_g - R_c = \Delta P_1$$

Table I below summarizes the dimensions for an embodiment of the system shown in FIG. 1 and also summarizes other operating parameters:

TABLE I

| | Symbol | Value used in Example I |
|---|---|---|
| Regenerator pressure | $=R_g$ | 12 p.s.i.g. |
| Bed height in regenerator | $=h_g$ | 15 feet. |
| Height of regenerator grid above U-bend entry. | $=H_g$ | 10 feet. |
| Height of reactor above U-bend outlet. | $=K$ | Do. |
| Height of reactor | $=H$ | 48 feet. |
| Level of catalyst in stripper | $=L_o$ | 20 feet. |
| Distance of bottom of stripper to U-bend inlet. | $=H_c$ | 0 feet. |
| Cyclone housing pressure | $=R_c$ | Value calculated p.s.i.g. by pressure balance. |
| $R_g - R_c$ | $=\Delta P_1$ | Value calculated p.s.i.g. by pressure balance, p.s.i. |
| Stripper pressure-cyclone housing pressure (the pressure drop across the gas valve). | $=\Delta P_2$ | Do. |
| Frictional loss in regenerator catalyst circuit. | $=F$ | 1 p.s.i. |
| Frictional loss in spent catalyst circuit. | $=F_2$ | 0 p.s.i. |
| Regenerator bed density | $=d_g$ | 16 lbs./cu. ft. |
| Stripper, downcomes and U-bend density. | $=d_s$ | 36 lbs./cu. ft. |
| Reactor catalyst density (function of circulation rate). | $=d_r$ | 4 (case 1) 8 (case 2) lbs./cu. ft. |
| Pressure loss in catalyst separator | $=L$ | 1 p.s.i. |

Substituting the data contained in Table I into the regenerated catalyst circuit pressure balance, it can be seen that $\Delta P_1 = 1.66$ and, consequently, $\Delta P_2$ representing the gas valve pressure drop equals 2.91 p.s.i. This corresponds to a hydraulic seal height above the level in the stripper of about 12 feet.

The differential pressure between the regenerator and the reactor housing is then increased from 1.66 p.s.i. to 3 p.s.i. The circulation of the catalyst increases commensurately and the density of the catalyst in the riser is found to be 8 pounds per cubic foot. This can be verified from Equation 1 if $\Delta P_1$ is set equal to 3 and the equation is solved for "$d_r$." With this change in the circulation rate, it is found that the hydraulic seal increases in height from 12 feet to about 17 feet. This can be verified by Equation 2, which shows that $\Delta P_2$ must increase by the same amount as $\Delta P_1$, i.e. 1.34 p.s.i. Thus it can be seen that as the regenerator pressure is increased, resulting in an increase in the fluid catalyst circulation rate within the transfer-line reactor, an increased demand is placed upon the stripper to return stripped catalyst to the regenerator at a faster rate. Simultaneously, the increased regenerator pressure is transmitted through the fluidized U-bend line into the stripper and tends to force an increase in the stripper level. In order to maintain the desired constant stripper level at the increased catalyst flow rate back to the regenerator, valve 68 shown in FIG. 1 is closed slightly. The resulting increased pressure differential between the stripper vapor in space 64 and the reactor separator 20 is compensated for by the increase in the catalyst head in the hydraulic seal leg shown in the example to go from a height of 12 feet to a height of about 17 feet.

What is claimed is:

1. In a catalytic cracking process comprising forming a suspension of catalyst particles in hydrocarbon vapors, passing said suspension through a conversion zone wherein said hydrocarbons are cracked, separating said cracked hydrocarbons from the spent catalyst particles, passing said cracked hydrocarbons to a recovery zone, stripping said spent catalyst particles of residual hydrocarbon vapors in a stripping zone, regenerating said spent catalyst to active catalyst in a regenerator zone and recycling said active catalyst to said conversion zone, the improvement which comprises interposing a hydraulic catalyst seal connecting the conversion zone and the stripping zone, said hydraulic catalyst seal being responsive to changes in pressure within said tripping zone, sensing the level of catalyst in the stripping zone, and adjusting the vapor pressure in the stripping zone so that the catalyst in the stripping zone is substantially maintained at a predetermined level independently of any change in the catalyst circulation rate within the conversion zone.

2. In a catalytic cracking apparatus comprising a transfer-line reactor adapted to receive a suspension of catalyst particles in hydrocarbon vapors and to cause cracking of said hydrocarbon vapors upon passage therethrough, means for separating the cracked hydrocarbon vapors from the spent catalyst particles upon egress from the terminal portion of said reactor, a stripper adapted to receive the spent catalyst particles and to strip residual hydrocarbon vapors therefrom upon passage of said catalyst particles therethrough, a regenerator adapted to receive the stripped catalyst and to regenerate said catalyst to active catalyst and recycle said active catalyst to said transfer-line reactor, the improvement which comprises a hydraulic catalyst seal openly communicating with the terminal portion of the transfer-line reactor and the catalyst inventory in the stripper, said hydraulic catalyst seal being responsive to changes in pressure within said stripper, means for sensing the level of catalyst in the stripper, and means for adjusting the vapor pressure in the stripper so that the catalyst in the stripper is substantially maintained at a predetermined level independently of any change in the catalyst circulation rate within the reactor.

3. Apparatus as defined in claim 2 wherein the transfer-line reactor terminates in means for crudely separating the cracked hydrocarbon vapors from the spent catalyst, said means communicating with the catalyst in the stripper to form a hydraulic catalyst seal therebetween.

4. Apparatus as defined in claim 2 wherein the means for separating the cracked hydrocarbon vapors from the spent catalyst particles upon egress from the terminal portion of said reactor openly communicates with the catalyst in the stripper via a conduit connecting said means with said stripper, said means being adapted to discharge said spent catalyst through said conduit to said stripper, said conduit adapted to contain a continual supply of catalyst thereby forming a hydraulic catalyst seal between the reactor and the stripper.

References Cited

UNITED STATES PATENTS

| 2,253,486 | 8/1941 | Belchetz | 208—153 |
| 3,513,087 | 5/1970 | Smith | 208—164 X |
| 2,422,793 | 6/1947 | McAfee | 208—164 X |
| 2,515,156 | 7/1950 | Jahnig et al. | 208—161 X |
| 2,663,675 | 12/1953 | Ewell | 208—153 X |
| 2,700,641 | 1/1955 | Rehbein | 208—161 X |
| 2,763,597 | 9/1956 | Martin et al. | 208—164 X |
| 3,213,014 | 10/1965 | Atkinson et al. | 208—164 X |
| 2,902,432 | 9/1959 | Codet et al. | 208—164 X |

DELBERT E. GANTZ, Primary Examiner

U.S. Cl. X.R.

23—288 S; 208—153